United States Patent [19]
Suchowski

[11] 3,730,138
[45] May 1, 1973

[54] THREE DIMENSIONAL AQUARIUM BACKGROUND

[75] Inventor: Bernard Suchowski, New York, N.Y.

[73] Assignee: Sternco Industries, Inc., Harrison, N.J.

[22] Filed: Aug. 25, 1971

[21] Appl. No.: 174,782

[52] U.S. Cl. ................................................. 119/5
[51] Int. Cl. ........................................... A01k 63/00
[58] Field of Search ........................................... 119/5

[56] References Cited

UNITED STATES PATENTS

| | | |
|---|---|---|
| 3,121,417 | 2/1964 | Goldman et al. ......................... 119/5 |
| 2,847,973 | 8/1958 | Pugh .......................................... 119/5 |
| 3,077,697 | 2/1963 | Fry ......................................... 119/5 X |
| 3,119,371 | 1/1964 | Zuckerman ............................... 119/5 |
| 2,002,380 | 5/1935 | Wernicke et al. ......................... 119/5 |
| 2,293,612 | 8/1942 | Montague ................................ 119/5 |
| 3,292,579 | 12/1966 | Buchanan................................. 119/5 |
| 2,888,205 | 5/1959 | Trucco ................................. 119/5 X |

*Primary Examiner*—Aldrich F. Medbery
*Attorney*—Emanuel R. Posnak

[57] ABSTRACT

A background of relief configuration suspended from the top edge of an aquarium behind its rear glass panel. The background is formed of relatively stiff material with high portions held in engagement with the outer surface of said panel, and depressed portions forming cavities, peripheral portions of the background being spaced from said panel and communicating with said cavities to provide ventilation, some depressed portions supporting electric light sockets with bulbs disposed within said cavities to illuminate the walls thereof.

10 Claims, 7 Drawing Figures

Patented May 1, 1973

INVENTOR.
BERNARD SUCHOWSKI
BY
ATTORNEY

Patented May 1, 1973
3,730,138
2 Sheets-Sheet 2
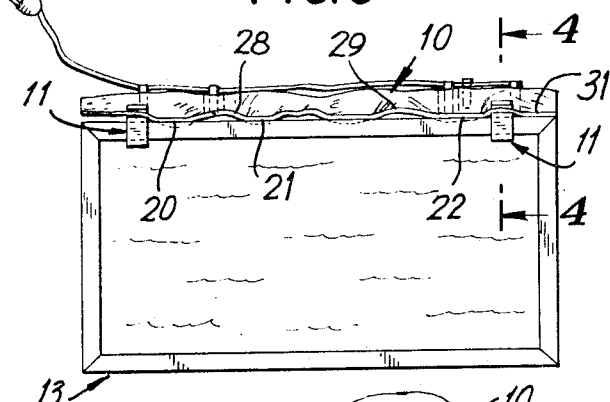
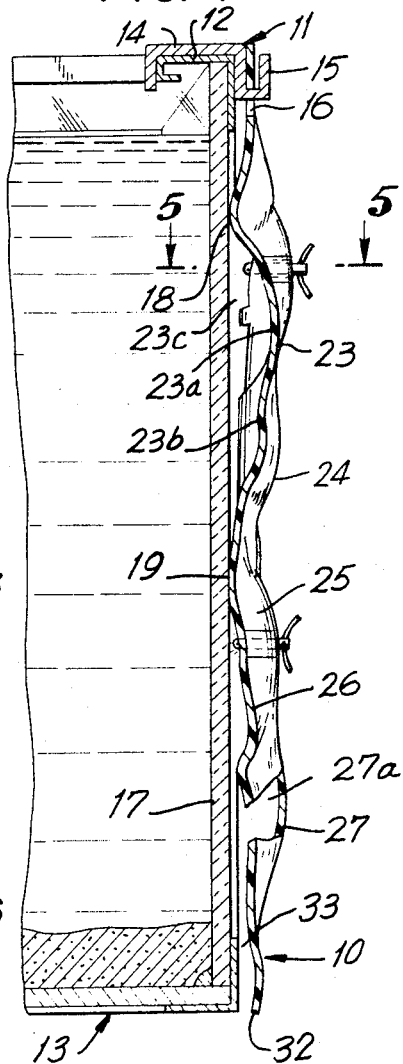
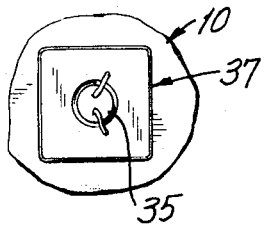
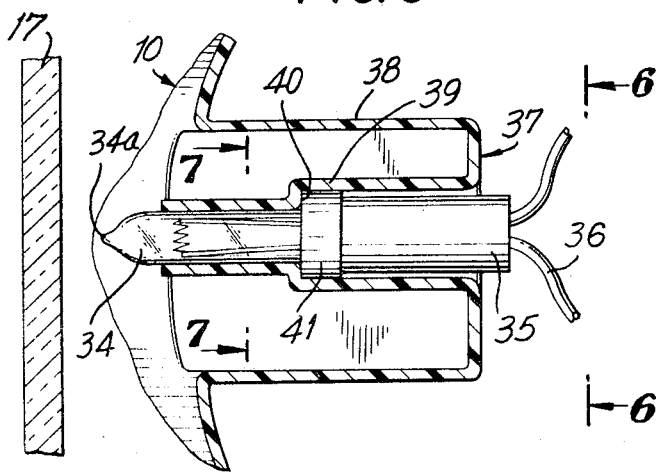
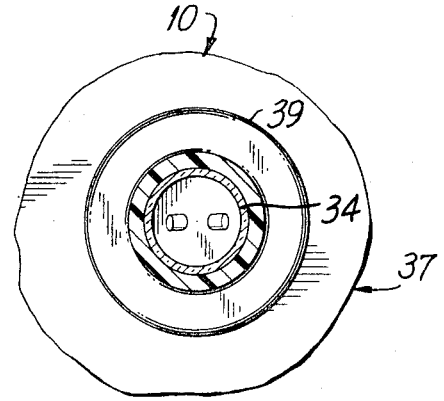
INVENTOR.
BERNARD SUCHOWSKI
BY
ATTORNEY

THREE DIMENSIONAL AQUARIUM BACKGROUND

BACKGROUND OF THE INVENTION

1. The Field of the Invention

This invention relates to aquarium backgrounds, particularly to ornamentally surfaced background of thin-walled material formed into three dimensional or relief configuration and positioned behind the rear glass panel of an aquarium tank, whereby the background is viewed through the water in the tank.

2. The Known Art

The use of backgrounds on aquarium tanks is a common expedient for enhancing the appearance of the visible aquarium display. Some of the known backgrounds comprise sheets adhesively applied to the inner surface of the rear glass panel, such devices being incapable of replacement and, unless made of special costly material, are subject to damage or to separation from the wall and deterioration due to the action of the water. Other backgrounds are applied to the outer surface of the rear glass panel, the background being peripherally glued to the wall. The latter type has proved to be unsatisfactory, first because they cannot be replaced to change the background effect, second because they often require special manipulative skill to apply, and third because, where the background is of three-dimensional configuration, the peripheral sealing prevents ventilation of the air spaces between the pressed-out portions of the background and the aquarium wall, often causing sweating of the confined outer glass surfaces and the consequent partial obscuring of the scene depicted on the background. Moreover, it has been found that where a three-dimensional background is applied to the outside surface of the aquarium panel, the walls of the rearwardly depressed portions or cavities cast shadows on the laterally enveloped background portions, thereby dimming the view of such areas through the water.

OBJECTIVES OF THE INVENTION

It is the objective of this invention to provide a relatively inexpensive background that presents an attractive three-dimensional effect without any of the aforesaid shortcomings. Among the specific objects are the provision of an aquarium background of relief configuration: that is removably applied to a viewable position behind the rear glass panel, that does not require the use of adhesive material, that has portions thereof in engagement with the rear glass panel for firm support, that has portions spaced from said panel to provide ventilation for air spaces in the rearwardly formed cavities of the background, that has lighting means in the said cavities to illuminate the background portions that are remote from the rear aquarium wall, and that has means for removing or replacing said lighting means.

Other objects, features and advantages will appear from the drawings and the description hereinafter given.

SUMMARY OF THE INVENTION

In the preferred form of this invention, a background sheet of thin relatively stiff material, such as thermoplastic composition, is employed, the background being of relief configuration. Parts of the background have high portions that are proportioned for engagement with the outer surface of the rear glass panel of an aquarium tank, other portions being recessed to form depressed sections spaced from said rear panel and being fully or partially surrounded by forwardly extending walls defining cavities. The outer periphery of the background sheet is preferably of irregular configuration, and has portions spaced rearwardly from said high portions, thereby providing communication between the outside atmosphere and said depressed sections, whereby the air spaces in the said cavities are ventilated. The entire background is removably suspended from the upper aquarium edge by a clip which is detachably connected to the upper portion of the background, the clip being so proportioned as to hold said high portions into engagement with the rear glass panel.

Detachably mounted at selected depressed sections of the background are electric light sockets containing bulbs that extend into the said cavities. The arrangement is such that the wall portions constituting said depressed portions of the background are illuminated, thereby not only bringing clearly into view the ornamented surfaces of said depressed portions, but also presenting an excitingly beautiful view as seen through the water. It is particularly to be noted that a portion of the heat generated by the bulbs is dissipated through the ventilating means above described.

DESCRIPTION OF THE DRAWINGS

FIG. 3 is a reduced top plan view of FIG. 1.

FIG. 4 is an enlarged vertical section of FIG. 3 taken substantially along line 4—4 thereof, a part being broken away for clarity.

FIG. 5 is an enlarged fragmentary section of FIG. 4 taken along line 5—5.

FIG. 6 is a reduced fragmentary rear view of FIG. 5 looking in the direction of arrows 6—6.

FIG. 7 is an enlarged section of FIG. 5 taken along line 7—7.

DESCRIPTION OF THE PREFERRED EMBODIMENT

Figure 1:
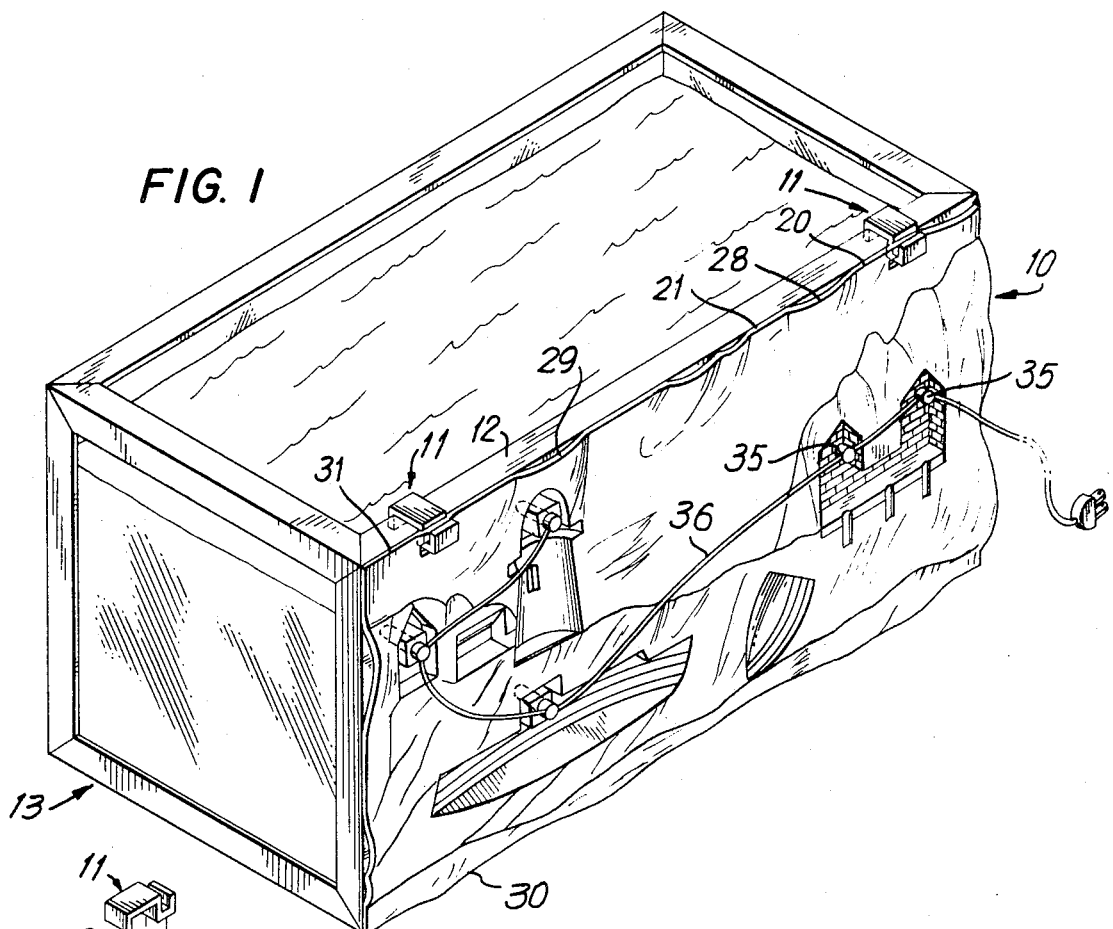
FIG. 1 is a perspective view of an aquarium tank with the background of this invention suspended from the rim of the tank behind its rear panel, the view showing the rear of the background.
Figure 2:
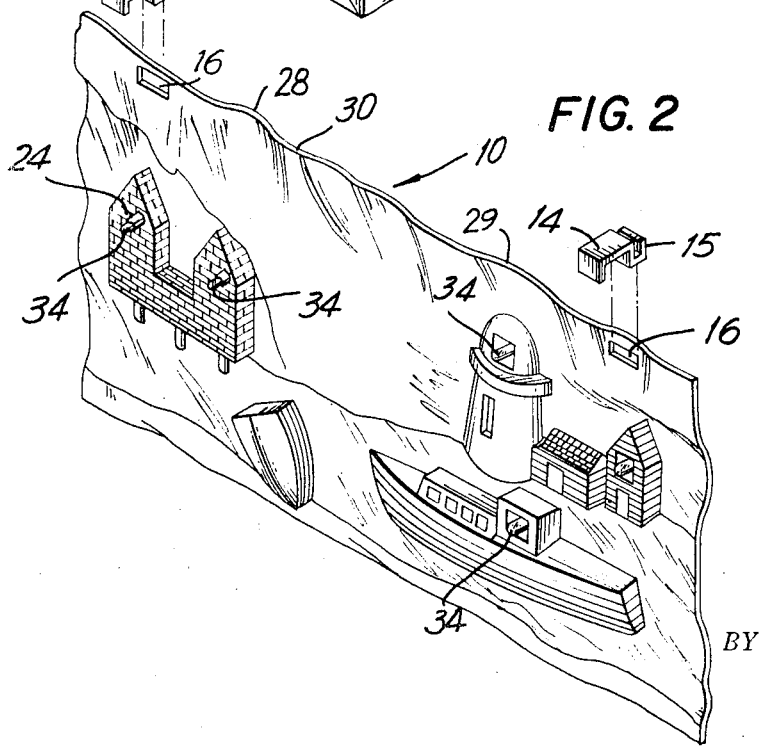
FIG. 2 is a front perspective view of the background of FIG. 1 and the supporting clips shown in disassembled relation.

In the preferred embodiment of this invention illustrated in the drawings, the background sheet generally designated 10 is suspended by the hook-like clips 11 from the upper rear rim 12 of the aquarium tank 13, the forward portions 14 of the clips being supported by said rim and the rear portions 15 extending through the apertures 16 at the upper portion of said background 10, whereby the background is held removably suspended behind the rear panel 17 of the aquarium 13.

The said background is preferably made of thin relatively stiff material, such as a suitable thermoplastic composition, and is of relief configuration with various high and depressed portions containing on the front surface thereof pictorial representations visible through the water of the tank and viewable from the front and side panels in known manner. The said rear portions 15 of the hooked clips 11 are relatively short and so proportioned as to hold the high portions of the aquarium sheet, such as portions 18, 19, 20, 21, 22 (FIGS. 3 and 4), against the back surface of the tank's rear panel 17, said high portions being so proportioned relative to said clips as to enable contact to be made with said panel for greater stability. The depressed portions of the sheet, such as portions 23, 24, 25, 26, 27, 28, 29 (FIGS. 3 and 4), are spaced rearwardly from said rear panel 17, the rearmost sections and the forwardly extending walls of said depressed portions, such as 23a and 23b, respectively (FIG. 4), forming cavities, such as cavity 23c. The various cavities formed by depressed wall portions communicate with channels that extend to peripheral portions of the background sheet 10 which are spaced from the said rear panel 17, so that there is communication between said cavities and the outside atmosphere, whereby the air spaces in said cavities are ventilated. To accomplish such ventilation the periphery 30 of the background sheet 10 is made of irregular configuration, said periphery having some portions thereof that are high sections in contact with the tank's rear panel 17 and other sections spaced rearwardly therefrom. For example, peripheral sections 20, 21 and 31 (FIGS. 1 and 3) are in engagement with the rear aquarium panel, and peripheral sections 28 and 29 are spaced from said panel, as is also bottom peripheral section 32 (FIG. 4). Those peripheral sections that are in spaced relation to the rear aquarium panel are connected with channels that communicate with the above-mentioned cavities. For example, cavity 27a (FIG. 4) communicates with channel 33 which connects with peripheral section 32, whereby said cavity 27a is in communication with the atmosphere and thus at all times ventilated.

In the preferred form of this invention illustrated, certain selected cavities are provided with electric light bulbs 34, the bases 35 of which are electrically connected to conductors 36 behind the background sheet 10 for connection to an electric outlet in known manner. The walls forming the depressed portions which define the selected cavities are shaped into the form of sockets 37 to slidably receive and hold the bulbs and their bases in proper positions for illuminating the respective cavity walls, the sockets being so proportioned as to hold the respective tips 34a of the bulbs 34 spaced rearwardly from the said rear panel 17 of the aquarium, as illustrated in FIG. 5. In the particular embodiment shown, the sockets 37 each comprises a rearwardly extending casing 38 integral with the wall of the background sheet and having an inner shell 39 in firm slidable engagement with the said base 35 of the bulb 34, the shell having a shoulder 40 in abutting engagement with the collar 41 of said base and serving as a stop to limit the forward movement of the bulb 34 and thus prevent its tip 34a from coming into engagement with said rear aquarium panel 17.

It is noteworthy that since said bulbs 34 are disposed within cavities that are ventilated in the manner above described, the heat generated by the bulbs is dissipated into the atmosphere.

In the above description, the invention has been disclosed merely by way of example and in preferred manner; but obviously many variations and modifications may be made therein. It is to be understood, therefore, that the invention is not limited to any particular form or manner of practicing same.

I claim:

1. A three dimensional background for positioning behind the rear panel of an aquarium tank, said background comprising a sheet of relatively stiff material of relief configuration and having high portions proportioned for engagement with the said rear panel of the tank and depressed portions extending rearwardly from said high portions and defining cavities, peripheral sections of said sheet being depressed rearwardly from said high portions to constitute a means to space the sheet from the rear panel of the tank and provide ventilation for said cavities to the ambient atmosphere whereby to prevent formation of condensation at said cavities.

2. A background for positioning behind the rear panel of an aquarium tank according to claim 1, said sheet having channels communicating between said cavities and said rear-wardly depressed peripheral sections.

3. A background for positioning behind the rear panel of an aquarium tank according to claim 1, the peripheral portion of said sheet being of irregular configuration with certain sections thereof positioned and proportioned for engagement with said rear panel of the tank, the other peripheral sections thereof constituting said rearwardly depressed sections.

4. A background for positioning behind the rear panel of an aquarium tank according to claim 3, and supporting means for suspending said background sheet from the upper rim of the tank, said means being so positioned and proportioned in relation to said high portions of said sheet as to hold said high portions in engagement with said rear panel when said supporting means are in operative engagement with said rim.

5. A background for positioning behind the rear panel of an aquarium tank according to claim 3, said sheet having apertured portions adjacent the upper edge thereof, and supporting clips in removable engagement with said apertured portions, said clips being hook-shaped and having a forward portion adapted for operative positioning upon the upper rim of the tank and a rear portion so positioned and proportioned in relation to said high portions of said sheet as to hold said high portions in engagement with said rear panel when said clips are in operative engagement with said rim.

6. A background for positioning behind the rear panel of an aquarium tank according to claim 1, and electric light means supported by certain of said depressed portions of said sheet and being disposed within the cavities defined by said depressed portions.

7. A background for positioning behind the rear panel of an aquarium tank according to claim 6, said depressed portions which define the cavities within which said electric light means are disposed being shaped into the form of sockets in slidable engagement with said electric light means.

8. A background for positioning behind the rear panel of an aquarium tank according to claim 7, said electric light means having a bulb and a base therefor, each of said sockets having stop means in engagement with said base for holding said bulb in a predetermined optimum position within its cavity with the bulb in spaced relation to the said rear panel of the tank.

9. A background for positioning behind the rear panel of an aquarium tank according to claim 8, said sockets each having a casing integral with the aquarium sheet and an inner shell in slidable supporting engagement with said base, said shell having a shoulder constituting said stop means.

10. A background for positioning behind the rear panel of an aquarium tank according to claim 8, the peripheral portion of said sheet being of irregular configuration with certain sections thereof positioned and proportioned for engagement with said rear panel of the tank, the other peripheral sections thereof constituting said rearwardly depressed sections, and supporting means for suspending said background sheet from the upper rim of the tank, said means being so positioned and proportioned in relation to said high portions of said sheet as to hold said high portions in engagement with said rear panel when said supporting means are in operative engagement with said rim, whereby said bulbs are maintained in said optimum position.

* * * * *